Aug. 4, 1953 W. H. TAYLOR 2,647,938
COMBINED ELECTROLYTIC BARRIER AND ELECTROLYTE
Filed Oct. 22, 1949
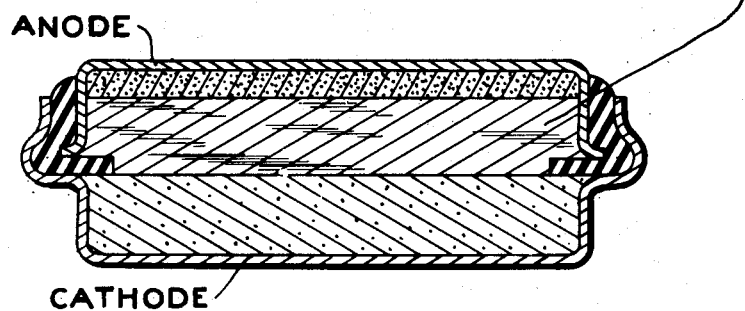
INVENTOR.
WALTER H. TAYLOR
BY
HIS ATTORNEYS Patented Aug. 4, 1953

2,647,938

UNITED STATES PATENT OFFICE 2,647,938

COMBINED ELECTROLYTIC BARRIER AND ELECTROLYTE

Walter H. Taylor, Williamstown, Mass., assignor to Sprague Electric Company, North Adams, Mass., a corporation of Massachusetts Application October 22, 1949, Serial No. 123,090

5 Claims. (Cl. 136—107)

This invention relates to electrochemical systems and more particularly concerns a novel, barrier electrolyte for use in primary cells, electrolytic condensers and the like.

In the construction of the so-called dry cells, it is customary to separate the anode compartment from the cathode compartment by a semipermeable membrane which prevents the migration of non-ionic constituents between the two electrodes. In alkaline cells, parchmentized paper is an example of such a barrier.

At the same time, the electrolyte in these cells often includes a thickening agent, such as starch or one of the cellulose ethers, or esters, for example, methyl cellulose and carboxymethylcellulose, respectively, to impart the so-called "dry" character to the electrolyte. Both the semipermeable membrane and the thickening agent add resistance to the cell, with the result that the combined effect is generally to make the internal resistance of the cell unduly high. This effect is particularly undesirable, when the cell is to be operated at high drains, e. g. with a low external (circuit) resistance.

It is an object of the present invention to overcome the foregoing and related disadvantages. A further object is to produce a low resistance, barrier electrolyte for primary cells. A still further object is to produce a low resistance, barrier electrolyte for alkaline zinc primary cells. Additional objects will become apparent from the following detailed description.

These objects are attained in accordance with my invention by providing an electrolyte comprising a gelled solution of an electrolyte and polyvinyl alcohol in a hydrophilic solvent. In a more restricted sense the invention is concerned with a solid electrolyte comprising a gelled solution of an alkaline electrolyte and polyvinyl alcohol in a solvent predominating in water. In a still more restricted sense this invention is concerned with a solid electrolyte for zinc primary cells comprising a gelled solution of polyvinyl alcohol in water, said gelled solution being treated for several hours in an electrolyte having a pH greater than about 7. In one of its specified embodiments, this invention is directed to a solid electrolyte for zinc primary cells comprising a gelled solution of a major amount of polyvinyl alcohol and a minor amount of borax in water, said gelled solution being treated for at least one hour with a solution of potassium hydroxide in water.

I have discovered that polyvinyl alcohol can be utilized in the formation of a novel type of barrier electrolyte, particularly useful for primary cells. By my invention the effect of the thickening agent used in conventional electrolytes is combined with that of a semi-permeable membrane. At the same time attack of the electrolyte on the anode during storage and idleness is prevented. Along with the above advantages I have found that my new electrolyte will carry the oxidized anode ions to permit continuance of the electrochemical action. The resistivity of the electrolytes prepared according to my invention is low, and it is satisfactory even at low temperatures. Because of their semi-rigid consistency, it is possible to produce sealed primary cells in which no liquid electrolyte is present, and in which the possibility of leakage is substantially eliminated. Some of the electrolytes of the invention are sufficiently rigid to permit molding of primary cells into plastic casings.

The barrier electrolytes of the invention are prepared by dissolving polyvinyl alcohol in a preferably warmed hydrophilic solvent, preferably comprising a hydroxyl compound and generally predominating in water, and then dissolving in said solution a gelling agent, which may be acidic or alkaline in nature. In the preferred embodiments of the invention, this gelling agent is borax.

Following formation of the solution is described above, gelling will take place rapidly at room temperature. It is generally desirable to pour the solution into a suitable steel mold before gelling occurs. After gelation, the gel is immersed in a liquid electrolyte, preferably consisting of a solution of an electrolyte in the same solvent that was used in preparing the gel. After the gel has been subjected to the electrolyte for some time, allowing the electrolyte itself to become absorbed within the gel, the gel is ready for incorporation in the electrochemical assemblies.

While the reason therefor is not fully apparent to me, it appears that some critical chemical and/or physical reaction takes place during the electrolyte treatment period, since the freshly prepared gel solution does not possess characteristics similar to those found in the aged gel. For example, the solution made up for the preparation of the gel will not dissolve zinc oxide which is formed in many primary cell systems, since the polyvinyl alcohol is incompatible therewith. The treated gel, however, has a marked tolerance for zinc oxide and will adsorb and transmit it readily, without precipitation of the polyvinyl alcohol.

By my invention it is, therefore, possible to produce electrolyte gels that will operate, for example, in alkaline zinc cells, since the zinc oxide or other oxidized zinc formed during the action of such cells, will be removed from the zinc anode surface, thus permitting continuance of the cell reaction.

While I am not fully aware of the reasons for the behavior of the electrolytes of the invention, I believe that the treatment of the polyvinyl alcohol gel with the electrolyte results in a degrading of the polymer chain, perhaps resulting in the formation of aldehyde groups within the mass and perhaps polyethine groups on the upper surface of the gel. (The upper surface is usually more or less in contact with air.) In any event the final barrier electrolyte is no longer characterized by the properties of normal polyvinyl alcohol gels. After the electrolyte treatment it may be heated to temperatures over 100° C. without melting or appreciable change in the physical rigidity. The utility of the barrier electrolytes of the invention is considerable.

The following examples will illustrate the preparation of typical barrier electrolytes of the invention.

Example 1

Thirty grams of 98.5–100% hydrolyzed polyvinyl-alcohol is added to 200 ml. of distilled water at room temperature and mechanically stirred into a smooth paste. The paste is then added to an additional 160 ml. of water heated to 70–75° C. in a water bath. It is held at that temperature while 70 ml. 50% KOH (50 g. KOH—50 ml. water) is added drop by drop. The hot sol (330 ml.) is then poured into a 7½" diam. crystallizing dish and set aside for five days to gel. After the end of five days, the disk of gel, now 6" in diameter, is immersed in about 250 ml. of 50% KOH solution to "cure." This treatment is continued for 4 days at the end of which time the barrier electrolyte is ready for use in primary cells.

Example 2

Thirty grams of 98.5–100% hydrolyzed polyvinyl alcohol are mechanically stirred into a smooth paste with 200 ml. of distilled water at room temperature. The paste is then added while stirring to 160 ml. water at 70–75° C. heated on a water bath. To this sol a solution of one gram of Congo red dissolved in 5 ml. water is added along with 30 ml. of ethylene glycol. The whole is well stirred and poured into a crystallizing dish to gel. This occurs within one to two hours when the gel may be removed from the dish for immersion in 50% KOH solution. After four hours a sufficient concentration of KOH has diffused into the gel for its use as a cell electrolyte.

Example 3

Twenty four grams of 98.5–100% hydrolyzed polyvinyl alcohol are added to 150 ml. of distilled water and stirred into a smooth paste. The paste is added to 150 ml. of distilled water at a temperature of 70° C. When solution is complete, 59 cc. of 50% KOH are slowly added, with continued agitation. The resulting sol is poured into a crystallizing dish and a solution of 0.3 gram of borax in 8 ml. water added. The sol is stirred to secure uniform solution. After 2 hours, the sol has gelled and a solution of 50% KOH in water is poured over it. The covered gel is allowed to stand overnight. On the next morning, the gel is translucent and has absorbed KOH to give a content of about 30%.

Example 4

Twenty four grams of 98.5–100% hydrolyzed polyvinyl alcohol are added to 140 ml. distilled water at room temperature and stirred to a smooth paste. The paste is then added to 100 ml. water at 70–75° C. within agitation. Ten ml. of ethylene glycol are added and finally, immediately before pouring, a solution of 0.25 g. borax in 60 ml. hot water is stirred into the sol. The resulting solution is poured into a stainless steel mold 0.3" thick and allowed to gel. This requires from one to two hours. Fifty per cent KOH solution is poured into the mold above the gel. The gel shrinks and separates smoothly from the mold in this treatment. Allowed to stand over night in the caustic solution, the gel is ready for use in cells the following morning.

The polyvinyl alcohol used in the preparation of the barrier electrolytes of the invention is preferably highly hydrolyzed. That is to say, the hydrolysis of polyvinyl acetate from which it is prepared should be substantially complete. However, less completely hydrolyzed grades may be employed with good results.

Various electrolyte materials may be used to treat the gels produced from the polyvinyl alcohol. A water solution of potassium hydroxide is the preferred material for the preparation of barrier electrolytes for alkaline zinc primary cells. However, sodium hydroxide, quaternary alkyl ammonium hydroxides and various other alkaline materials are suitable. The electrolytes may be dissolved in water, ethylene glycol, alcohol, or other suitable solvents. Some of the electrolytes are liquids per se and need not be applied in solution.

As shown in Example 2, hydroxy compounds other than water are useful to modify the physical characteristics of the gels. Ethylene glycol, propylene glycol, methyl alcohol, ethyl alcohol, butyl alcohol, and various other materials, in these classes may be used to supplement or replace water. The particular material selected depends upon the rigidity and toughness desired in the final barrier electrolyte, on the temperature range to which the barrier electrolyte will be subjected in use, etc.

The treatment with electrolyte solution, such as that employed in Examples 3 and 4, generally is carried out for at least one hour, although with very thin barrier electrolytes this time may be reduced considerably. Likewise for thick electrolytes the treatment time may be as great as 24 hours for the rapidly gelled solutions (Examples 3 and 4) or several days in the case of the slow gel material (Example 1).

In many instances it is desirable to initially obtain uniform films of polyvinyl alcohol and subsequently to immerse them in electrolyte solutions, instead of dissolving them initially in a solvent to form a gel. Films so immersed may be swelled with electrolyte solution to form tough barrier electrolytes.

According to one of the limited embodiments of the invention the gelling process is accelerated by the use of what shall be termed gelling agents. Included among such agents are borax, boric acid, Congo red, gallic acid, alpha-naphthol, resorcinol, benzo purpine. It should be noted that following treatment with electrolyte the gels produced are no longer reversible, that is, no longer melt upon heating. I prefer to use borax since it is effective in very small amounts and is soluble in the solvents employed for the barrier electrolyte.

As a general rule, I prefer to maintain the initial gel content within the ranges indicated below.

For gels which do not include gelling agent I prefer to maintain between about 10 and 30 parts of polyvinyl alcohol to between about 300 and 500 parts of water, to between about 10 and about 50 parts of alkaline electrolyte.

For barrier electrolytes which initially contain a gelling agent, I prefer to maintain from about 10 to about 30 parts of polyvinyl alcohol to between about 280 and about 500 parts of water, to between about 0 and about 50 parts of alkaline electrolyte and between about 0.1 part and about 1.5 parts of gelling agent.

In many instances it is desirable to replace the water with from about 2% to about 15% of other hydroxy solvent such as ethylene glycol.

According to one of the preferred embodiments of my invention the initial gel is prepared with about 24 parts of polyvinyl alcohol, 300 parts of water, 10 parts of ethylene glycol and .25 part of borax. This gel is preferably treated with 50% aqueous potassium hydroxide to convert the gel into a useful barrier electrolyte.

The barrier electrolytes of the invention are particularly useful in the manufacture of primary cells of the alkaline type. The

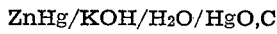
ZnHg/KOH/H$_2$O/HgO,C cell may employ the barrier electrolytes of the invention as the entire electrolyte compartment without special fillers, barriers, retaining members and the like.

After treatment with electrolyte is complete, the surface of the gel, which is more or less exposed to air, possesses a horny skin which is even tougher than the rest of the gel. This horny skin appears to be a particularly effective barrier against nonionic particle migration in assembled alkaline cells. For most applications, it is desirable to place this horny skin against the oxidizing agent within the primary cell.

When the device employing the gel is to be operated and/or stored at elevated temperatures, I have found that the gelled electrolyte should be held at an elevated temperature, usually between about 50° C. and about 75° C. in the presence of liquid electrolyte to bring about an equilibrium condition which will be maintained during use of the gelled electrolyte. Shrinkage of the gel is thus avoided. This treatment forms one of the preferred embodiments of the invention and widens the useful temperature range over which the gel electrolyte may be employed.

It is apparent that the aged, gelled electrolytes of my invention are applicable to the other systems employing electrolytes, such as electrolytic condensers, providing a pH in excess of 7 can be employed.

As many different embodiments of this invention may be made without departing from the spirit and scope hereof, it is to be understood that the invention is not limited to the specific embodiments hereof, except as defined in the appended claims.

The accompanying drawing illustrates a new battery of the instant invention. For convenience, the anode, the cathode, and the polyvinyl alcohol combined gelled electrolyte and barrier of this battery have been labeled. It will be recognized by those skilled in the art that these are the essential parts of the instant invention as claimed.

I claim:

1. An alkaline primary cell consisting of an anode, a cathode, a polyvinyl alcohol combined gelled electrolyte and barrier comprising water, an alkaline electrolyte compound, and polyvinyl alcohol, and appropriate retaining structure for said elements.

2. An alkaline zinc mercuric oxide primary cell in which the principal functional parts consist of a zinc anode, a mercuric oxide cathode and an alkaline combined barrier and gelled electrolyte composed of polyvinyl alcohol and an aqueous alkaline electrolyte compound.

3. A primary cell as defined in claim 2, said combined barrier and alkaline electrolyte comprising between 10 and 30 parts of polyvinyl alcohol, 300 to 500 parts of water and 10 to 50 parts of an alkaline electrolyte compound.

4. An alkaline cell as defined in claim 3, in which said alkaline electrolyte compound is potassium hydroxide.

5. An alkaline primary cell as defined in claim 2 wherein a gelling agent is combined with said polyvinyl alcohol.

WALTER H. TAYLOR.

References Cited in the file of this patent

UNITED STATES PATENTS

| Number | Name | Date |
|---|---|---|
| 2,422,045 | Ruben | June 10, 1947 |
| 2,463,565 | Ruben | Mar. 8, 1949 |
| 2,536,696 | Ruben | Jan. 2, 1951 |
| 2,536,699 | Ruben | Jan. 2, 1951 |
| 2,576,266 | Ruben | Nov. 27, 1951 |
| 2,593,893 | King | Apr. 22, 1952 |
| 2,606,941 | Ruben | Aug. 12, 1952 |

FOREIGN PATENTS

| Number | Country | Date |
|---|---|---|
| 479,502 | Great Britain | Feb. 7, 1938 |

OTHER REFERENCES

Otto et al., "Low Temperature Dry Cells," Transactions of the Electrochemical Society, vol. 90, 1946, pp. 419–432, page 425 relied upon.

Elvanol, "Polyvinyl Alcohols," issued by E. I. du Pont de Nemours & Co., February 11, 1948, 44 pages, pages 24–30 relied upon.